UNITED STATES PATENT OFFICE.

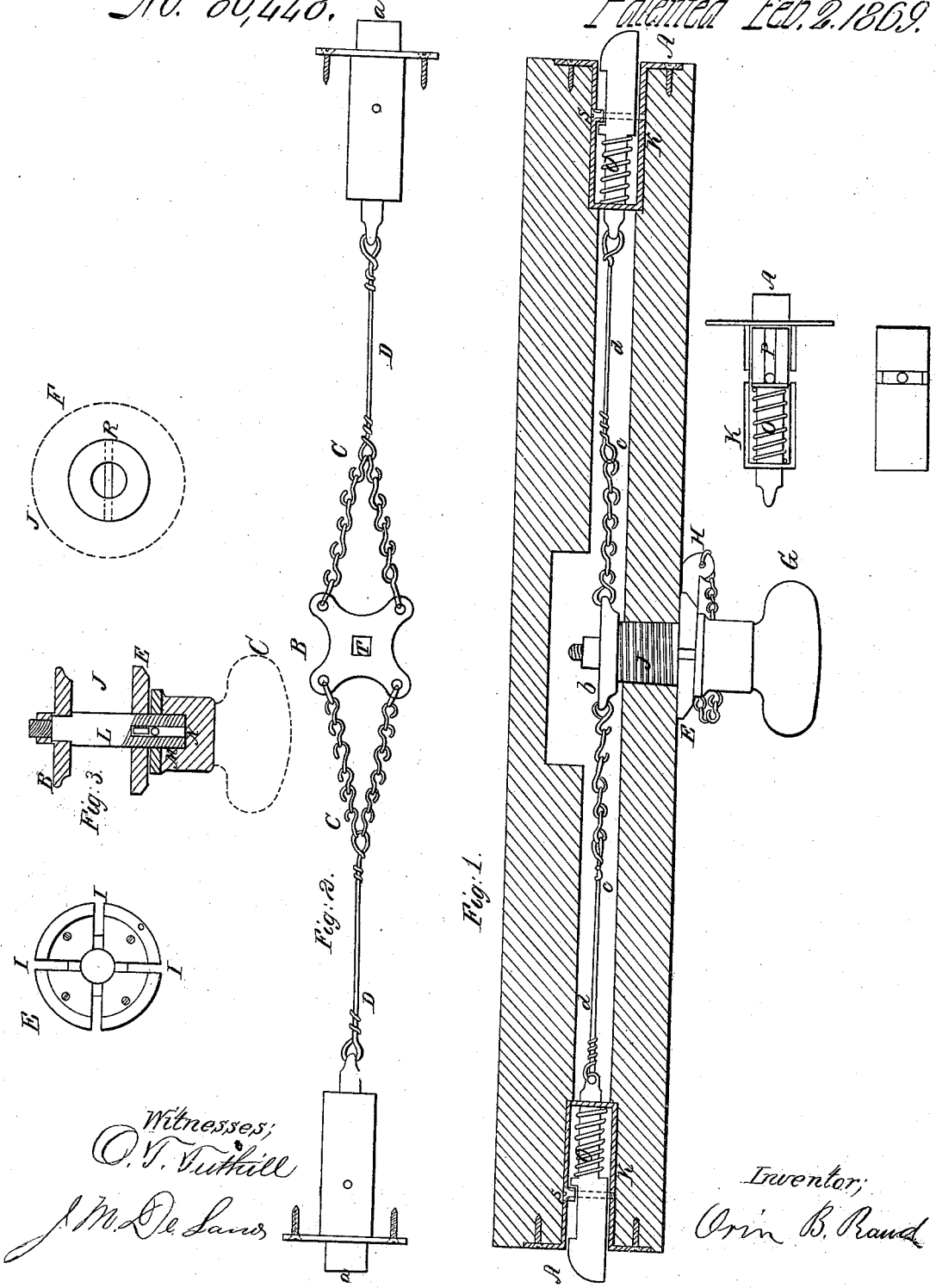

ORIN B. RAND, OF KALAMAZOO, MICHIGAN.

Letters Patent No. 86,448, dated February 2, 1869.

IMPROVEMENT IN KNOB-LATCHES.

The Schedule referred to in these Letters Patent and making part of the same.

*To all whom it may concern:*

Be it known that I, ORIN B. RAND, of Kalamazoo, in the county of Kalamazoo, in the State of Michigan, have invented a new and improved Double-Acting Spring-Bolt Door-Fastener; and I do hereby declare that the following is a full and exact description thereof, reference being had to the accompanying drawings, and to the letters of reference marked thereon.

The nature of my invention consists in providing the door, at both upper and lower ends, with sliding bolts combined with spiral springs, and connected with rods and chains along a groove in the side, to the flange of the knob, in the centre, in such a manner as to perform the object of bolting the door at top and bottom, at the same time, by the turning of the knob in either direction.

To enable others skilled in the art to make and use my invention, I will proceed to describe its construction and operation.

I construct the two bolts A A, as shown in accompanying drawings, alike in form, and fashioned like any in common use, with a slot running through them large enough to admit a small screw, as shown at P and S in accompanying drawing.

Around the inner extremity of the bolts I construct a small spiral spring, made from brass or steel, as shown at O O, and held in its place by the casing of the bolts K K, as shown in accompanying drawing.

The bolts may be made from iron or brass; usually I make them out of cast-iron. They may be made any desired length and size, and so placed in the door for operating, that when at the liberty of the springs, they will project at either end about an inch, as shown at *a a* in accompanying drawing.

To these bolts I attach wire rods, D D, and small chains, C C, as shown in accompanying drawing, so that the rods attach immediately to the bolt, and the chains, four in number, to the rods at one end, and at the other to each of the four ends of a lever-flange, separately, as shown by B in accompanying drawing.

The length of these rods and chains I regulate in proportion to the length of door.

I make an opening square in the centre of the lever-flange B, as shown at T, for the purpose of admitting the spindle to which the knob is attached, and by which the bolts are drawn.

I make the spindle L, as shown in accompanying drawing, the desired length and size, with a screw-thread on the outer end, (see M, in drawing,) on to which the knob is screwed. In this end of the spindle L, I make a slot the length of the screw, as shown at N, accompanying drawing.

I make a cylinder with screw-threads on its outer surface, and a round opening through its centre, through which the spindle L passes and turns, in operating the bolts A A, as shown at J and K in drawing F. This cylinder screws into an opening made into the wood of the door.

I make also, and attach to the cylinder F, on its outer end, and immediately next the knob, a flange, as shown at E in accompanying drawing, made out of any desirable metal. Into this flange E, I construct, on its face, four slots, as shown at I in drawing, equidistant from each other, and extending through it in depth, and to its centre in length.

The object of this flange and its slots is to admit a small key, H, through into the slot N, in the spindle above described, for the purpose of locking the bolts A A, either when drawn, or when at the force of the springs O O.

Figures 1, 2, and 3, in accompanying drawing, show the application of my invention, of all its parts, to each other, as above described.

Fig. 1 is the drawing of a working-model, showing its construction, combination, and manner of operating, which is done by simply turning the knob G either to the right or left, and inserting the key H into the slots, when desired, as above described.

Fig. 2 represents the attachment of the rods and chains D D and C C to the bolts A A and lever-flange B, as heretofore described. The purpose of the double chains on each side, is to give the knob, when turned, a double control over the bolts, two of the chains, one on each side, slacking, (in the operation of turning the knob,) while the other two are taut, and *vice versa*, when turned in the opposite direction.

Fig. 3 represents the combination, when ready for operation, of the screw-cylinder F, lever-flange B, spindle L, slot N, screw M, and knob G, and flange E, attached to cylinder F.

What I claim as my invention, and desire to secure by Letters Patent, is—

The door-latch described, consisting of the slotted spindle L, slotted flange E, with key H, screw-cylinder J, lever-flange B, chains C, rods D, and bolts *a*, with springs O, the whole being combined and operated in the manner described, for the purpose set forth.

ORIN B. RAND.

Witnesses:
J. M. DE LANO,
H. A. DE LANO.